(12) United States Patent
Lassen

(10) Patent No.: US 10,151,589 B2
(45) Date of Patent: Dec. 11, 2018

(54) OPEN WATER SWIM NAVIGATION APPARATUS AND METHOD

(71) Applicant: Kent Lassen, Birmingham, MI (US)

(72) Inventor: Kent Lassen, Birmingham, MI (US)

( * ) Notice: Subject to any disclaimer, the term of this patent is extended or adjusted under 35 U.S.C. 154(b) by 128 days.

(21) Appl. No.: 15/021,162

(22) PCT Filed: Sep. 9, 2014

(86) PCT No.: PCT/US2014/054753
§ 371 (c)(1),
(2) Date: Mar. 10, 2016

(87) PCT Pub. No.: WO2015/038527
PCT Pub. Date: Mar. 19, 2015

(65) Prior Publication Data
US 2016/0223338 A1   Aug. 4, 2016

Related U.S. Application Data (60) Provisional application No. 61/875,953, filed on Sep. 10, 2013.

(51) Int. Cl.
*A63B 33/00* (2006.01)
*G01C 21/20* (2006.01)
(Continued)

(52) U.S. Cl.
CPC ............ *G01C 21/20* (2013.01); *A63B 33/002* (2013.01); *A63B 71/0622* (2013.01);
(Continued)

(58) Field of Classification Search
CPC ........ G01C 21/20; H04R 5/02; H04R 5/0335; H04R 2460/13; H04R 2420/07; H04R 2201/023; G02B 27/017; G02B 27/0176; G02B 2027/0178; G02B 2027/014; G01S 19/35; G01S 19/19; G01S 19/42; G06F 1/163; A63B 71/0622; A63B 33/002; A63B 2225/60; A63B 2071/0666;
(Continued)

(56) References Cited

U.S. PATENT DOCUMENTS 7,310,427 B2 * 12/2007 Retchin ................ H04R 1/1066
381/151
2002/0196953 A1 * 12/2002 Burke .................... H04R 17/00
381/190

(Continued)

FOREIGN PATENT DOCUMENTS

| DE | 10209060683 A1 | 1/2011 |
| WO | 2004013977 A2 | 2/2004 |
| WO | 2012046156 A1 | 4/2012 |

OTHER PUBLICATIONS

Machine Translation of DE102009060683 (Year: 2009).*

*Primary Examiner* — Alan D Hutchinson
(74) *Attorney, Agent, or Firm* — Vincent N. Mastrogiacomo (57) ABSTRACT

An open water navigation apparatus for use by a swimmer, the navigation apparatus includes a pair of swim goggles having a right lens, a left lens, and a head strap, a navigation module retained on the head strap of the pair of swim goggles, and a navigational signal output mechanism connected for signal communications to the navigation module.

6 Claims, 4 Drawing Sheets

(51) Int. Cl.
*G01S 19/42* (2010.01)
*A63B 71/06* (2006.01)
*G01S 19/19* (2010.01)
*G01S 19/35* (2010.01)
*G06F 1/16* (2006.01)
*G02B 27/01* (2006.01)
*H04R 5/02* (2006.01)
*H04R 5/033* (2006.01)
*A63B 24/00* (2006.01)
*B63C 11/12* (2006.01)
*B63B 49/00* (2006.01)

(52) U.S. Cl.
CPC .............. *G01S 19/19* (2013.01); *G01S 19/35* (2013.01); *G01S 19/42* (2013.01); *G02B 27/017* (2013.01); *G02B 27/0176* (2013.01); *G06F 1/163* (2013.01); *H04R 5/02* (2013.01); *H04R 5/0335* (2013.01); *A63B 2024/0025* (2013.01); *A63B 2033/004* (2013.01); *A63B 2071/063* (2013.01); *A63B 2071/0625* (2013.01); *A63B 2071/0655* (2013.01); *A63B 2071/0666* (2013.01); *A63B 2207/02* (2013.01); *A63B 2208/03* (2013.01); *A63B 2209/10* (2013.01); *A63B 2220/12* (2013.01); *A63B 2225/50* (2013.01); *A63B 2225/60* (2013.01); *B63B 49/00* (2013.01); *B63C 2011/121* (2013.01); *G02B 2027/014* (2013.01); *G02B 2027/0178* (2013.01); *H04R 2201/023* (2013.01); *H04R 2420/07* (2013.01); *H04R 2460/13* (2013.01)

(58) Field of Classification Search
CPC .......... A63B 2208/03; A63B 2071/063; A63B 2024/0025; A63B 2033/004; A63B 2071/0625; A63B 2225/50; A63B 2209/10; A63B 2071/0655; A63B 2207/02; A63B 2220/12; B63B 49/00; B63C 2011/121
See application file for complete search history.

(56) References Cited

U.S. PATENT DOCUMENTS

2003/0115010 A1    6/2003   Estep
2008/0018532 A1    1/2008   Mackintosh et al.
2010/0134297 A1    6/2010   Baldwin
2012/0166024 A1    6/2012   Phillips et al.
2012/0220317 A1    8/2012   Hollis et al.
2015/0042476 A1*   2/2015   Holm .................. G08B 21/088
                                                340/573.4

* cited by examiner

OPEN WATER SWIM NAVIGATION APPARATUS AND METHOD

CROSS-REFERENCE TO RELATED APPLICATIONS

This application claims priority to PCT Application PCT/US2014/054753 filed Sep. 9, 2014 which claims the benefit of U.S. Application No. 61/875,953 filed Sep. 10, 2013. The disclosures of the above applications are incorporated herein by reference.

FIELD

The present disclosure relates to a Global Positioning System based navigational system, and more specifically to a Global Positioning System based navigation system for providing navigational aid to a user in a large body of water.

BACKGROUND

The statements in this section merely provide background information related to the present disclosure and may or may not constitute prior art.

A typical global positioning device or system (GPS) is designed to provide the user with spacial coordinates which can then be superimposed on a map of the location where the GPS device is located. Such GPS devices can be combined with memory features to provide the user a history of the locations that the GPS has been. In effect, the combined device tracks or measures along with temporal data the location of the GPS over a certain period of time to provide such data as time elapse, distance traveled, etc.

When applying the concepts of a GPS tracking system to the sport of open water swimming or triathlon competitions, the device performs in water in a similar manner as it performs on land. However, a hint to its shortcomings is revealed once the user reviews the stored data by way of a tracking map. Whereas on land, a runner has the benefit of a road, track, or trail to keep from veering off course, a swimmer in the open water has no such luxury. Therefore, one of less obvious challenges of open water swimming is maintaining a consistent heading on an established course. For example, a swimming pool provides lane lines, turn targets, and swimming lines to help swimmers maintain a straight line of travel. However, when swimming in the open water there are no markings underwater or otherwise that the swimmer can use to maintain a straight heading on the course. The current method for a swimmer to maintain position on the course is to break stroke, lift their head out of the water, and search for the buoy or course markers. In rough waters, this method can take even longer to perform if the swimmer has to wait for a wave to lift them high enough to see the reference markers. This method results in an inefficient swim that is 10% to 20% longer in distance than the actual distance of the course.

While current GPS based devices achieve their intended purposes there is a need for a new GPS based device that allows the user to follow a prepared course that requires less effort on the part of the user.

SUMMARY

The present invention provides an open water navigation apparatus for use by a swimmer. The navigation apparatus includes a pair of swim goggles, a navigation module, and a navigational signal output mechanism. The pair of swim goggles have a right lens, a left lens, and a head strap. The navigation module is retained on the head strap of the pair of swim goggles. The navigational signal output mechanism is connected for signal communications to the navigation module.

In one example of the present invention, the navigational signal output mechanism is connected to the navigation module by a hard wire connection.

In another example of the present invention, the navigational signal output mechanism is connected to the navigation module by a wireless communication connection.

In yet another example of the present invention, the navigational signal output mechanism is a pair of vibration modules.

In yet another example of the present invention, the navigational signal output mechanism includes a pair of swimmers ear plugs each including an audio speaker.

In yet another example of the present invention, the navigational signal output mechanism includes a pair of light emitting devices with one of the pair of light emitting devices disposed on each of two lenses of the swim goggles.

In yet another example of the present invention, the navigation module includes a GPS engine, an electrical power source, and a controller contained in a housing.

In yet another example of the present invention, the global positioning sensor provides global positioning coordinate data to the controller.

In yet another example of the present invention, the controller processes the global positioning coordinate data, compares the global positioning coordinate data to a course heading, and provides output signals to the navigational signal output mechanism.

The present invention also provides an open water navigation apparatus for use by a swimmer. The navigation apparatus includes a pair of swim goggles, a navigation module, and a navigational signal output mechanism. The pair of swim goggles have a right lens, a left lens, and a head strap. The navigation module includes a global positioning sensor, a processor, an electrical power source, and a communications module contained in a housing. The housing has a bracket so that the navigation module is attached to the head strap of the pair of swim goggles by the bracket. The navigational signal output mechanism is connected for communication to the communications module of the navigation module. The processor of the navigation module includes a memory and a control logic sequence for operating the swim navigation apparatus.

In one example of the present invention, the control logic sequence includes a first through eighth control logics. The first control logic is for receiving input data from a user and storing the input data as a first waypoint $W_1$ in the form of a GPS coordinate point. The second control logic is for receiving a current position GPS coordinate from the global positioning sensor and storing in the memory the current position GPS coordinate as position $P_x$. The third control logic is for receiving the another position GPS coordinate from the global positioning sensor and storing in memory the current position GPS coordinate as position $P_{x+1}$. The fourth control logic is for recalling positions $P_x$ and $P_{x+1}$ from the memory, calculating a vector $V_x$ using positions $P_x$ and $P_{x+1}$ as endpoints of the vector $V_x$, and storing the vector $V_x$ in the memory. The fifth control logic is for recalling position $P_{x+1}$ and the first waypoint $W_1$ from the memory, calculating a vector $V_{x+1}$ using $P_{x+1}$ and the first waypoint $W_1$ as endpoints of the vector $V_{x+1}$ and storing the vector $V_{x+1}$ in the memory. The sixth control logic is for recalling the vector $V_x$ and the vector $V_{x+1}$, calculating an angle $\alpha_x$ between the vector $V_x$ and the vector $V_{x+1}$ using $P_{x+1}$ as a vertex of the angle $\alpha_x$ and comparing the angle $\alpha_x$ to a user defined angle $\Delta_x$. The seventh control logic is for deciding if the angle $\alpha_x$ is greater than the angle $\Delta_x$ and if the angle $\alpha_x$ is negative or positive. The eighth control logic is for activating a left output signal of the navigational signal output mechanism if the angle $\alpha_x$ is negative and greater than the angle $\Delta_x$, for activating a right output signal of the navigational signal output mechanism if the angle $\alpha_x$ is positive and greater than the angle $\Delta_x$, and for deactivating the navigational signal output mechanism if the angle $\alpha_x$ is less than the angle $\Delta_x$.

In another example of the present invention, the navigational signal output mechanism is connected to the navigation module by a hard wire connection.

In yet another example of the present invention, the navigational signal output mechanism is connected to the navigation module by a wireless communication connection.

In yet another example of the present invention, the navigational signal output mechanism includes a left and right swimmers ear plugs with each of the ear plugs having an audio speaker.

In yet another example of the present invention, the navigational signal output mechanism includes a right and left light emitting device with the left light emitting device disposed on the left lens of the swim goggles and the right light emitting device disposed on the right lens of the swim goggles.

Further features and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
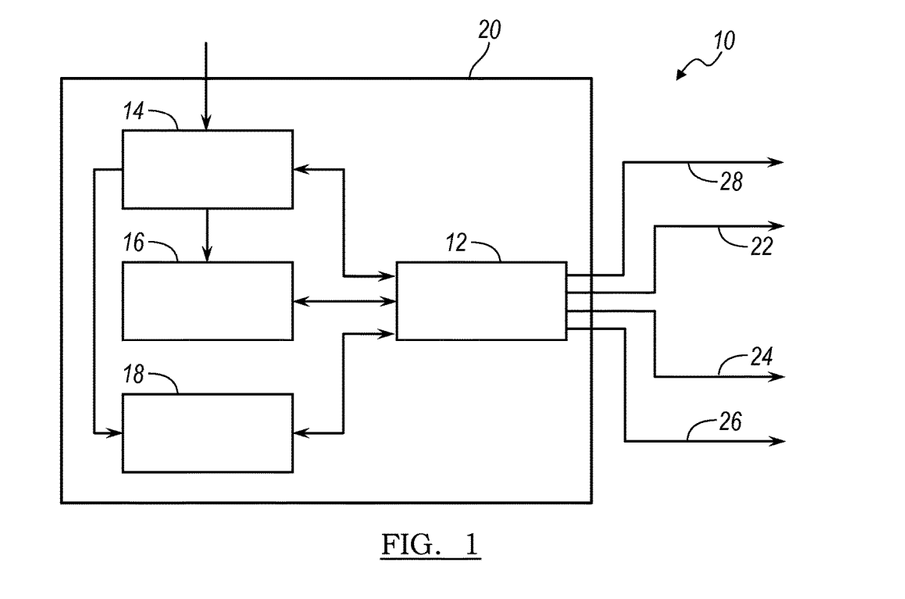
FIG. 1 is a schematic diagram of a GPS based device according to the present disclosure.

With reference to FIG. 1, an exemplary GPS based navigation system or module 10 is illustrated and will now be described. The navigation system or module 10 includes a processor or controller 12, a battery 14, a GPS engine 16, and a Bluetooth or WiFi communications module 18. The processor or controller 12, battery 14, GPS engine 16 and communication module 18 are contained in a housing 20 that may be made water resistant or waterproofed. The battery 14 provides operating power to the processor or controller 12, GPS engine 16, and communications module 18. The GPS engine 16 provides global positioning coordinate data to the processor or controller 12. The communications module 18 provides the processor or controller 12 with hard-wired or wireless communication with additional devices such as a desktop computer, a tablet based computer, or a smartphone among other possible devices (not shown). The processor or controller 12 is capable of providing the user with several output signals including but not limited to battery charging status 22, power status 24, GPS satellite signal status 26, and navigational signals 28.

Figure 2:
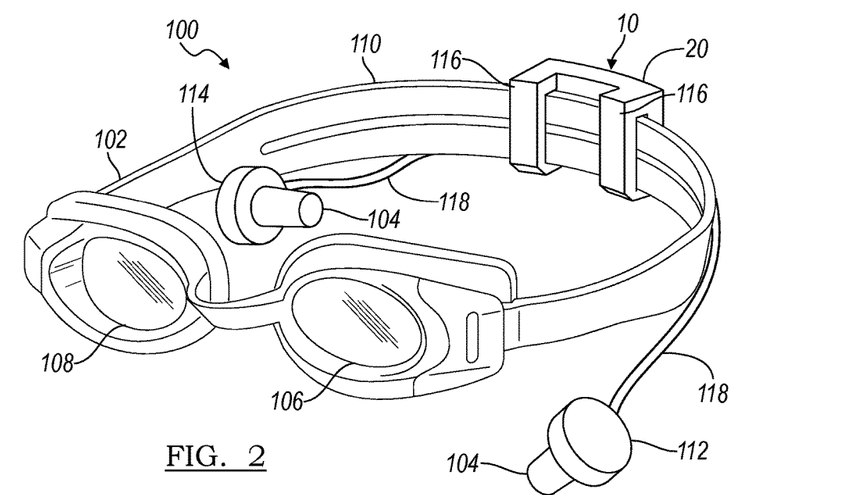
FIG. 2 is a depiction of a pair of swim goggles including the GPS based device according to the present disclosure.
Figure 3:
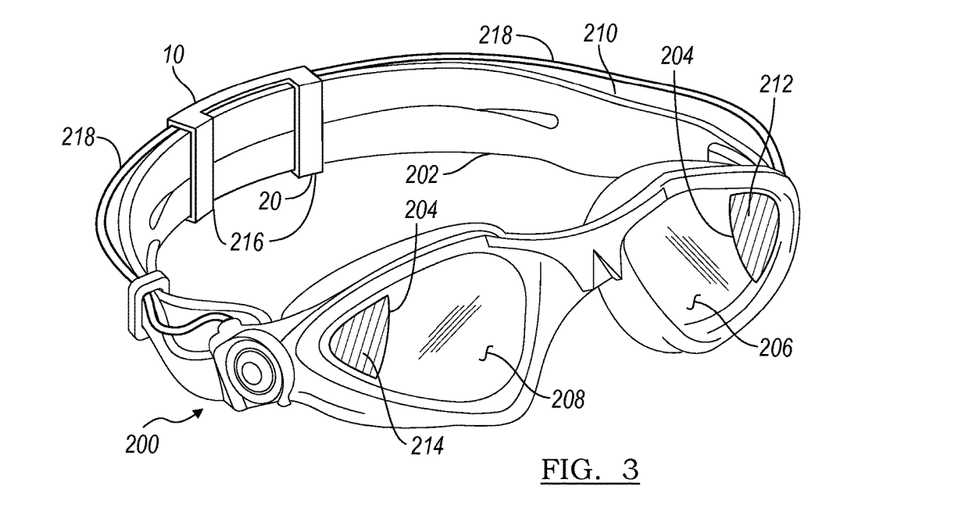
FIG. 3 is depiction of a pair of swim goggles including the GPS based device according to the present disclosure.
Figure 4:
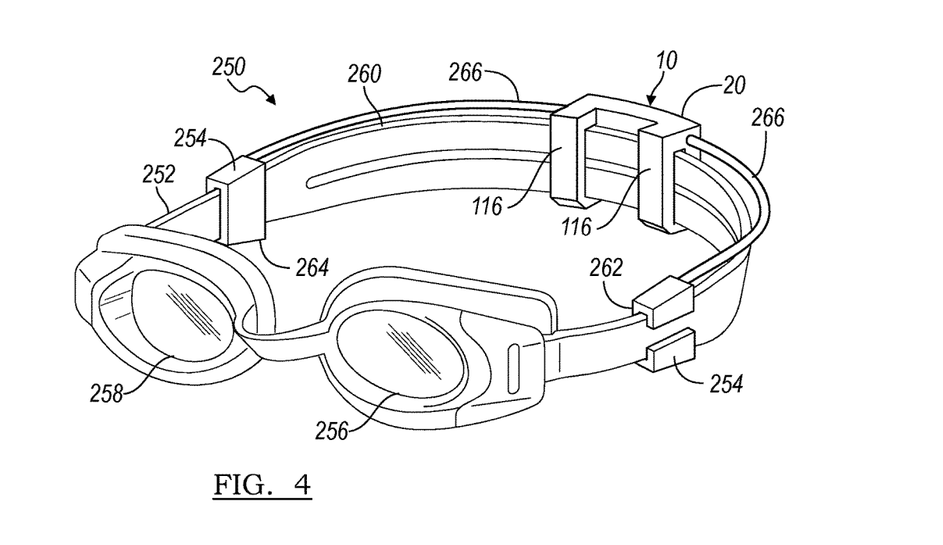
FIG. 4 is depiction of a pair of swim goggles including the GPS based device according to the present disclosure.

Turning now to FIGS. 2-4, a number of example of the GPS-based navigation system or module 10 are illustrated and will now be described. First, an example of a swimmers navigation system or module 100 is shown in FIG. 2. The swimmers navigation system or module 100 includes the navigation system or module 10 of FIG. 1, a pair of swimmers eye goggles 102, and a pair of audio speakers 104. The swimmers eye goggles 102 include a left lens 106, a right lens 108, and a head strap 110. The pair of audio speakers 104 includes a left speaker 112 and a right speaker 114 that are configured to fit snuggly inside the user's ear and may also be configured to act as a water-tight ear plug. The housing 20 of the navigation system or module 10 is further configured to attach or is retained by the head strap 110. This may be accomplished as shown in FIG. 2 using a pair of brackets 116 that is molded into the housing 20, however, other methods of retaining the navigation system or module 10 to the eye goggles 102 may be employed without departing from the scope of the invention. For example, a snap mechanism or hook-and-loop retention feature may be used to retain the navigation system or module 10 to the eye goggles 102. The swimmers navigation system or module 100 also includes a pair of wires 118 that connect the pair of speakers 104 to the navigation system or module 10. Again, alternative method of connection can be employed between the pair of speakers 104 and the navigation system or module 100 without departing from the scope of the invention. For example, the speakers 104 may be connected wirelessly through Bluetooth technology or the like.

Referring now to FIG. 3, a second example of a swimmers navigation system 200 is shown and will now be described. The swimmers navigation system 200 includes the navigation system or module 10 of FIG. 1, a pair of swimmers eye goggles 202, and a pair of light emitting devices 204. The swimmers eye goggles 202 include a left lens 206, a right lens 208, and a head strap 210. The pair of light emitting devices 204 includes a left light emitting device 212 and a right light emitting device 214. For example, the left light emitting device 212 is disposed on the inside surface of the left lens 206 of the eye goggles 202. Likewise, the right light emitting device 214 is disposed on the inside surface of the right lens 208 of the eye goggles 202. The light emitting devices 212, 214 may be light emitting diodes (LED) or any other type of light emitting device without departing from the scope of the invention. Further, the lenses 206, 208 may be capable of emitting a light signal without departing from the scope of the invention. The housing 20 of the navigation system or module 10 is further configured to attach or is retained by the head strap 210. This may be accomplished as shown in FIG. 3 using a pair of brackets 216 that is molded into the housing 20, however, other methods of retaining the navigation system or module 10 to the eye goggles 202 may be employed without departing from the scope of the invention. For example, a snap mechanism or hook-and-loop retention feature may be used to retain the navigation system or module 10 to the eye goggles 202. The swimmers navigation system 200 also includes a pair of wires 218 that connect the pair light emitting devices 204 to the navigation system or module 10. Again, alternative method of connection can be employed between the pair of light emitting devices 204 and the navigation system or module 10 without departing from the scope of the invention. For example, the light emitting devices 204 may be connected wirelessly through Bluetooth technology or the like.

Referring now to FIG. 4, another example of a swimmers navigation system 250 is shown and will now be described. The swimmers navigation system or module 250 includes the navigation system or module 10 of FIG. 1, a pair of swimmers eye goggles 252, and a pair of vibration modules 254. The swimmers eye goggles 252 include a left lens 256, a right lens 258, and a head strap 260. The pair of vibration modules 254 includes a left vibration module 262 and a right vibration module 264 that are configured to attach to the head strap 260 such that the vibration modules 262, 264 are located proximate to the swimmer's temples. The pair of vibration modules 254 provides a signal in the form of a vibration capable of being felt by the swimmer while swimming. The housing 20 of the navigation system or module 10 is further configured to attach or is retained by the head strap 260. This may be accomplished as shown in FIG. 4 using a pair of brackets 116 that is molded into the housing 20, however, other methods of retaining the navigation system or module 10 to the eye goggles 252 may be employed without departing from the scope of the invention. For example, a snap mechanism or hook-and-loop retention feature may be used to retain the navigation system or module 10 to the eye goggles 252. The swimmers navigation system or module 250 also includes a pair of wires 266 that connect the pair of vibration modules 254 to the navigation system or module 10. Again, alternative method of connection can be employed between the pair of vibration modules 254 and the navigation system or module 10 without departing from the scope of the invention. For example, pair of vibration modules 254 may be connected wirelessly through Bluetooth technology or the like.

Figure 5:
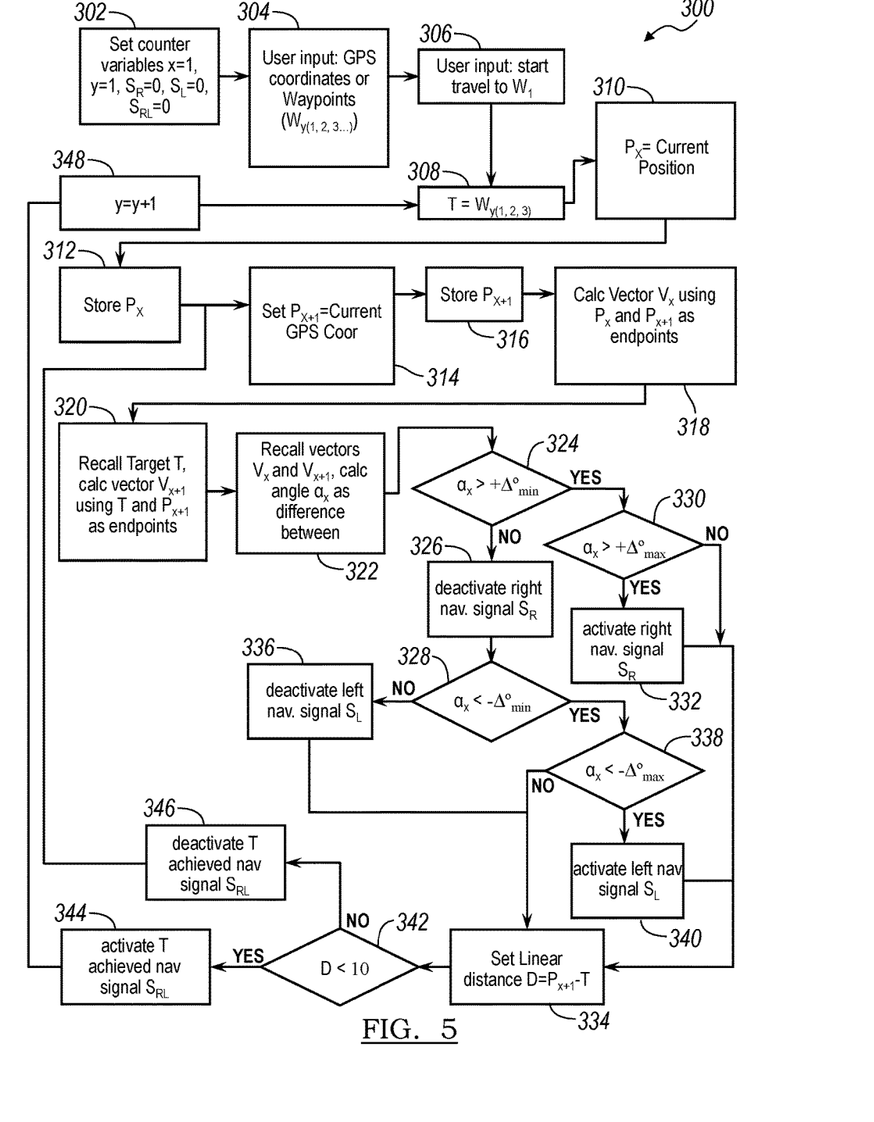
FIG. 5 is a flowchart of a method or control logic followed by the GPS based device according to the present disclosure.

Returning now to FIG. 1 with ongoing reference to FIG. 5, the processor or controller 12 and its functions will now be described. The processor or controller 12 generally includes an electronic control device having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and executable by the processor or controller 12. As stated above, the processor or controller 12 receives data input from the GPS engine 16 and the communication module 18 and provides several outputs including satellite signal status 26 and navigation signals 28 among other outputs.

For example, a control logic or method 300, shown in flowchart form in FIG. 4, is implemented in software program code that is executable by the processor or controller 12 and includes a first control logic 302 for setting several counter variables, for example, x=1, y=1, $S_R$=0, $S_L$=0, and $S_{RL}$=0, whereas $S_R$ represents a right navigational signal, $S_L$ represents a left navigational signal, and $S_{RL}$ represents a waypoint reached navigational signal. A second control logic 304 receives user input data including at least one GPS coordinate and assigns and stores the at least one GPS coordinate as a first waypoint $W_1$. Additional GPS coordinates may be received, assigned, stored as a second waypoint $W_2$, a third waypoint $W_3$, etc. . . . . A third control logic 306 receives the user's indication of the start of travel advancing to the first waypoint $W_1$. A fourth control logic 308 assigns a variable Target T the stored GPS coordinates of the first waypoint $W_1$ and in subsequent loops the current waypoint $W_y$. A fifth control logic 310 samples the current GPS coordinate and sets the variable $P_x$ equal to the current GPS coordinate. A sixth control logic 312 stores $P_x$ in memory while the processor waits t seconds. A seventh control logic 314 samples the current GPS coordinate and sets the variable $P_{x+1}$ equal to the current GPS coordinate. An eighth control logic 316 stores $P_{x+1}$ in memory. A ninth control logic 318 recalls $P_x$ and $P_{x+1}$, calculates a first vector $V_x$ using $P_x$ and $P_{x+1}$ as endpoints, and stores $V_x$ in memory. A tenth control logic 320 recalls Target T, calculates a second vector $V_{x+1}$ using T and $P_{x+1}$ as endpoints, and stores $V_{x+1}$ in memory. An eleventh control logic 322 recalls first and second vectors $V_x$ and $V_{x+1}$ from memory and calculates an angle $\alpha_x$ between $V_x$ and $V_{x+1}$. A twelfth control logic 324 decides if the angle $\alpha_x$ is greater than a user defined angle $+\Delta°_{min}$. If the angle $\alpha_x$ is not greater than a user defined angle $+\Delta°_{min}$ the control logic goes on to a thirteenth control logic 326. The thirteenth control logic 326 deactivates the right navigational signal $S_R$. and the control logic 300 continues on to a sixteenth control logic 328. If the angle $\alpha_x$ is greater than a user defined angle $+\Delta°_{min}$ the control logic goes on to a fourteenth control logic 330. The fourteenth control logic 330 decides if the angle $\alpha_x$ is greater than a user defined angle $+\Delta°_{max}$. If the angle $\alpha_x$ is greater than a user defined angle $+\Delta°_{max}$ the control logic goes on to a fifteenth control logic 332. The fifteenth control logic 332 activates the right navigational signal $S_R$ and the control logic 300 goes on to a twentieth control logic 334. If the angle $\alpha_x$ is less than a user defined angle $+\Delta°_{max}$ the control logic 300 skips the fifteenth control logic 332 and goes on to the twentieth control logic 334. The sixteeth control logic 328 follows directly from the thirteenth control logic 326 and decides if the angle $\alpha_x$ is less than a user defined angle $-\Delta°_{min}$. If the angle $\alpha_x$ is not less than the user defined angle $-\Delta°_{min}$ the control logic 300 goes on to a seventeenth control logic 336. If the angle $\alpha_x$ is less than the user defined angle $-\Delta°_{min}$ the control logic 300 goes on to an eighteenth control logic 338. The seventeenth control logic 336 deactivates the left navigational signal $S_L$ and the control logic 300 continues on to the twentieth control logic 334. The eighteenth control logic 338 decides if the angle $\alpha_x$ is less than a user defined angle $-\Delta°_{max}$. If the angle $\alpha_x$ is not less than the user defined angle $-\Delta°_{max}$ the control logic 300 goes on to the twentieth control logic 334. If the angle $\alpha_x$ is less than the user defined angle $-\Delta°_{max}$ the control logic 300 goes on to a nineteenth control logic 340. The nineteenth control logic 340 activates the left navigational signal $S_L$ and continues on to the twentieth control logic 334. The twentieth control logic calculates the linear distance between $P_{x+1}$ and T and stores this distance as D. The twenty-first control logic 342 decides if the distance D is less than another user defined distance, for example, 10 meters. If the distance D is less than 10 meters, the control logic goes to a twenty-second control logic 344. If the distance D is not less than 10 meters, the control logic 300 goes to a twenty-third control logic 346. The twenty-second control logic 344 activates the waypoint reached navigational signal $S_{RL}$ and the control logic continues to a twenty-fourth control logic 348. The twenty-third control logic 346 deactivates the waypoint reached navigational signal $S_{RL}$ and the control logic 300 returns back to the seventh control logic 314. The twenty-fourth control logic 348 advances the counter variable y=y+1 and the control logic 300 returns back to the fourth control logic 308.

Figure 6:
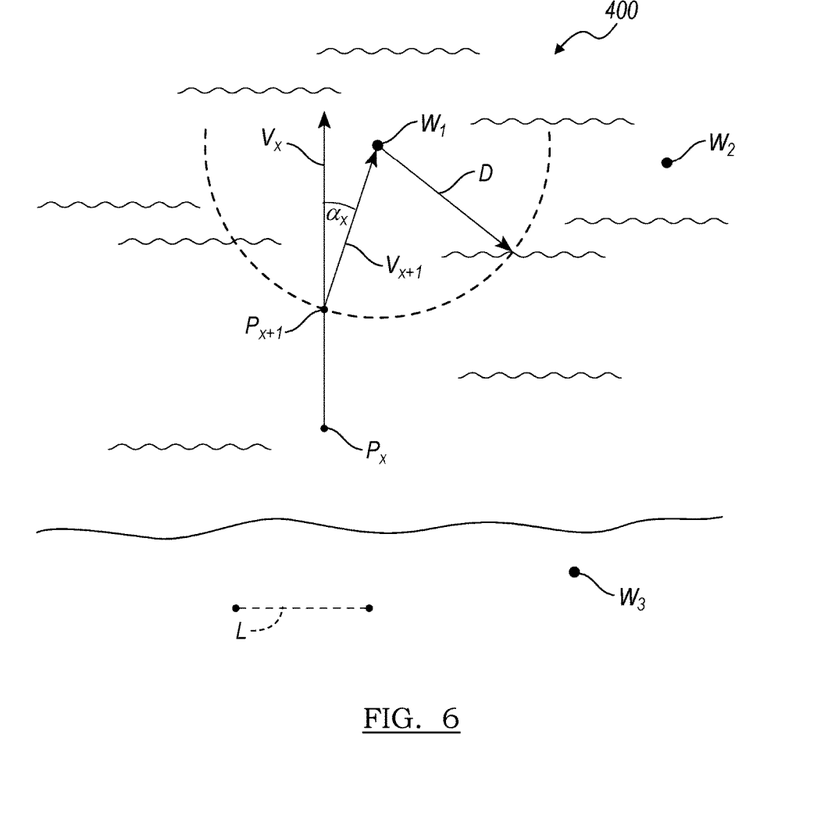
FIG. 6 is a visual depiction of the method or control logic followed by the GPS based device according to the present disclosure.

Turning now to FIG. 6, a graphical depiction of the control logic in an open water swim scenario 400. In preparation of the swim, the swimmer inputs the waypoint GPS coordinates of the course buoys as $W_1$, $W_2$, $W_3$. The starting line L is on a shore or beach that gives way to a large body of water such as an inland lake. A swimmer wearing one of the embodiments of the swimmer's navigation system or module 100, 200 starts into the lake and follows the navigational signals $S_R$, $S_L$, $S_{RL}$ provided by the navigation system or module 100, 200 which direct the swimmer to the waypoints $W_1$, $W_2$, $W_3$ in succession. The navigation system follow a method that begins by taking two samples the GPS coordinates $P_x$, $P_{x+1}$ of the swimmer and calculates a first vector $V_x$ having $P_x$ and $P_{x+1}$ as endpoints. A second vector $V_{x+1}$ is calculated using $P_{x+1}$ and $W_1$ as endpoints. An angle $\alpha_x$ is calculated between the first and second vectors $V_x$ and $V_{x+1}$. If the angle $\alpha_x$ less than a preset sensitivity level, then the swimmer is on a narrow heading to the waypoint $W_1$. If the angle $\alpha_x$ greater than the preset sensitivity level, then the swimmer is given navigational signals to correct the course. Also, the swimmer's navigation system or module 100, 200 provides a signal to the swimmer when the waypoint is reached $W_1$ and resets the waypoint to the second waypoint $W_2$.

The description of the invention is merely exemplary in nature and variations that do not depart from the gist of the invention are intended to be within the scope of the invention. For example, a method or control logic using a start point and endpoint that provides the swimmer with a virtual lane to swim by giving navigational signals to keep the swimmer in the virtual lane. Such variations are not to be regarded as a departure from the spirit and scope of the invention.

What is claimed is:

1. An open water navigation apparatus for use in conjunction with a pair of swim goggles by a swimmer, the navigation apparatus comprising:
   a navigation module including a global positioning sensor (GPS), a processor, an electrical power source, and a communications module contained in a housing having a bracket, wherein the navigation module is attached to the head strap of the pair of swim goggles by the bracket;
   a navigational signal output mechanism connected for communication to the communications module of the navigation module, and wherein the navigational signal output mechanism includes a right and left light emitting device with the left light emitting device disposed on a left lens of the swim goggles and the right light emitting device disposed on a right lens of the swim goggles; and
   wherein the processor of the navigation module includes a memory and a control logic sequence for operating the swim navigation apparatus, the control logic sequence includes:
      a first control logic for receiving input data from a user and storing the input data as a first waypoint $W_1$ in the form of a GPS coordinate point;
      a second control logic for receiving a current position GPS coordinate from the GPS and storing in the memory the current position GPS coordinate as position $P_x$;
      a third control logic for receiving a second position GPS coordinate from the GPS and storing in memory the second position GPS coordinate as position $P_{x+1}$;
      a fourth control logic for recalling positions $P_x$ and $P_{x+1}$ from the memory, calculating a vector $V_x$ using positions $P_x$ and $P_{x+1}$ as endpoints of the vector $V_x$, and storing the vector $V_x$ in the memory;
      a fifth control logic for recalling position $P_{x+1}$ and the first waypoint $W_1$ from the memory, calculating a vector $V_{x+1}$ using $P_{x+1}$ and the first waypoint $W_1$ as endpoints of the vector $V_{x+1}$ and storing the vector $V_{x+1}$ in the memory;
      a sixth control logic for recalling the vector $V_x$ and the vector $V_{x+1}$ calculating an angle $\alpha_x$ between the vector $V_x$ and the vector $V_{x+1}$ using $P_{x+1}$ as a vertex of the angle $\alpha_x$ and comparing the angle $\alpha_x$ to a user defined angle $\Delta_x$;
      a seventh control logic for deciding if the angle $\alpha_x$ is greater than the angle $\Delta_x$ and if the angle $\alpha_x$ is negative or positive; and
      an eighth control logic for activating a left output signal of the navigational signal output mechanism if the angle $\alpha_x$ is negative and greater than the angle $\Delta_x$, for activating a right output signal of the navigational signal output mechanism if the angle $\alpha_x$ is positive and greater than the angle $\Delta_x$, and for deactivating the navigational signal output mechanism if the angle $\alpha_x$ is less than the angle $\Delta_x$.

2. The swim navigation apparatus of claim 1 wherein the navigational signal output mechanism is connected to the navigation module by a hard wire connection.

3. The swim navigation apparatus of claim 1 wherein the navigational signal output mechanism is connected to the navigation module by a wireless communication connection.

4. An open water navigation apparatus for use in conjunction with a pair of swim goggles by a swimmer, the navigation apparatus comprising:
   a navigation module including a global positioning sensor, a processor, an electrical power source, and a communications module contained in a housing having a bracket, wherein the navigation module is attached to a head strap of the pair of swim goggles by the bracket and the processor includes a memory and a control logic sequence for operating the swim navigation apparatus;
   a navigational signal output mechanism connected for communication to the communications module of the navigation module, and wherein the navigational signal output mechanism includes a right and left light emitting device with the left light emitting device disposed on a left lens of the swim goggles and the right light emitting device disposed on a right lens of the swim goggles; and
   wherein the global positioning sensor provides global positioning coordinate data to the controller, the controller processes the global positioning coordinate data, compares the global positioning coordinate data to a course heading, and the control logic sequence includes a control logic for activating a left output signal of the navigational signal output mechanism if the swimmer needs to veer left to maintain a vector towards a preprogramed global positioning coordinate and for activating a right output signal of the navigational signal output mechanism if if the swimmer needs to veer right to maintain the vector towards the preprogramed global positioning coordinate.

5. The swim navigation apparatus of claim 4 wherein the navigational signal output mechanism is connected to the navigation module by a hard wire connection.

6. The swim navigation apparatus of claim 4 wherein the navigational signal output mechanism is connected to the navigation module by a wireless communication connection.

\* \* \* \* \*